United States Patent [19]

Gray, Jr.

[11] Patent Number: 4,996,556

[45] Date of Patent: Feb. 26, 1991

[54] LARGE DOCUMENT COPYING SYSTEM

[75] Inventor: Gerald A. Gray, Jr., Webster, N.Y.

[73] Assignee: Xerox Corporation, Stamford, Conn.

[21] Appl. No.: 389,094

[22] Filed: Aug. 3, 1989

[51] Int. Cl.⁵ .............................................. G03B 27/50
[52] U.S. Cl. ....................................... 355/50; 355/311
[58] Field of Search ..................... 355/50, 51, 75, 311, 355/104, 117; 271/3, 3.1, 75; 242/68.4, 66

[56] References Cited

U.S. PATENT DOCUMENTS

| | | | |
|---|---|---|---|
| 3,239,220 | 3/1966 | Lot et al. | 271/75 |
| 3,589,808 | 6/1971 | Vecchio | 355/311 |
| 4,821,974 | 4/1989 | Poehlein | 242/68.4 |

*Primary Examiner*—L. T. Hix
*Assistant Examiner*—D. Rutledge

[57] ABSTRACT

A system for copying large documents on a large document copier having a large document sheet feeder and a large copy sheet or web feeder with improved convenience and efficiency by inserting the leading edge of the large document into the document feeder from the front of the copier, automatically initially rapidly feeding the large document away from the front of the copier with the document feeder, pausing the feeding of the large document in a position wherein a trailing portion is retained in the document feeder but a substantial portion of the document is at the rear of the copier, so that the front of the large document copier is unobstructed, then inserting a copy sheet or web into the copier from the front thereof for copying, and in response to this and copier activation, first automatically rapidly feeding the large document back in a reverse direction with the large document feeder without copying, up to a position where a leading edge portion of the document is retained by the document feeder, and then, promptly thereafter, automatically again reversing the direction of feeding the document and moving the document at a copying speed synchronized with movement of the copy sheet or web towards the rear of the copier for copying the large document onto the copy sheet or web.

8 Claims, 2 Drawing Sheets

4,996,556

LARGE DOCUMENT COPYING SYSTEM

Cross-reference is made to copending applications by the same assignee, filed June 1, 1989, as U.S. App. No. 07/359,611 and U.S. App. No. 07/360,176, respectively, Attorney Docket Nos. D/89090 and D/89089. If any claim may be made for the benefit of the priority or filing date thereof it is hereby made.

This invention relates generally to large sheet copying machines, and more particularly to an improved but simple and low cost large document and copy handling and feeding system for a large sheet or web copying system, as, for example, an engineering or architectural drawing copier or the like.

Various types of engineering drawing or other large sheet or web copiers are known in the art. An early xerographic engineering drawing copier with large document feeding is shown in Xerox Corp. U.S. Pat. No. 3,239,220. The following patent disclosures are notes by way of background examples of Xerox Corporation large document and large copy sheet copiers, including those with document feeders: U.S. Pat. Nos. 4,771,310; 4,823,663; 4,784,345; 4,714,978; 4,138,102; 4,688,926; 4,690,540; 4,653,894; 4,666,293; 4,689,471; 4,680,040; 4,693,588; 4,639,122; 4,766,456; 4,822,978; 4,821,974.

Some examples of U.S. patents on servo-motor or stepper-motor driven original document feeders for copiers, in general, are U.S. Pat. Nos. 3,888,579; 4,000,943; 4,008,956; 4,144,550; 4,283,773; 4,455,018; and 4,579,444.

The "document" here is the sheet (original or previous copy) being copied in the copies onto the "copy-sheet", or "copy". In the terminology herein the term "document" or "document sheet" refers to a conventional sheet of paper, plastic, or other such conventional individual physical image media or substrate, which is usually flimsy, relatively difficult to manipulate, and easily damaged.

Various sheet feeders are used with automated drive rolls and the like in various printers and/or copiers, but these feeders are often inappropriate for use in feeding large sheets, especially for low cost, slow speed, coping machines. It is necessary to feed copy sheets in some of these machines measuring, for example, 61×91 cm. (24×36 inches) or 91×122 cm. (36×48 inches), or even uncut webs of much greater length. Furthermore, loading of large documents and/or copy sheets presents operator handling difficulties and is time consuming. Typically, loading and unloading of the large sheets involves critical manual handling steps.

Mishandling or misfeeding of large document or copy sheets in (and to and from) a copier can cause wrinkling, buckling, tearing, or other sheet damage. It can also cause miscopying, such as skewed, uneven, unevenly magnified, or misregistered images. Thus, the loading, starting positions, speed (sheet velocity) and direction of movement of the large documents and/or copy sheets can be quite critical to commercially acceptable copying.

In the embodiment disclosed herein, one particular disclosed feature relates to the interrelationship of large document and copy sheet feeding in a large document copier. In such copiers typically the large documents are loaded into and fed by constant velocity transport document handler or CVT. Typically, a CVT has document feeding roller nips on opposite sides of an illuminated imaging slit. Typically, the CVT moves the document past an illuminated imaging slit for scanning copying while the document is moving at a speed corresponding to the surface speed of the imaging surface. The imaging surface may be a photoreceptor, as described here, on which an image is developed and transferred to a copy sheet media. In the disclosed embodiment of the subject system and apparatus, the documents are first acquired and moved by the CVT, without copying, from the front to the rear of the machine, stopped and held paused with the trail edge of the document in the rear CVT nip, so that the document is out of the way of the front of the machine, and before a copy sheet is loaded or fed. Then the copy sheet is loaded—unobstructedly. Then, automatically, after the copy sheet is acquired, the document is fed back forward at high speed until (only) the document lead edge is in the front nip, and then both the document and copy sheet are fed rearwardly in coordination for copying. The latter steps can be repeated for plural copies made from the same document without reloading the document, since the document is not fully released by the CVT until after all copying thereof is completed. Other disclosed features relate to the DH construction, sensor and trays locations, etc..

A specific feature of the embodiment disclosed herein is to provide a system for copying large documents on a large document copier having a large document sheet feeder and a large copy sheet or web feeder with improved convenience and efficiency comprising the steps of: inserting the leading edge of said large document into said document feeder from the front of said large document copier, automatically initially feeding said large document away from the front of said large document copier with said large document feeder, pausing said feeding of said large document by said large document feeder in a position wherein a trailing portion of said large document is retained by said document feeder and a substantial portion of said large document is removed from the front of said large document copier so that the front of said large document copier is unobstructed by said large document, inserting a copy sheet or web into said large document copier from the front thereof for copying, activating said large document copier to copy said large document onto said copy sheet or web after said copy sheet or web has been inserted, and, in response to said copying activation, first automatically rapidly feeding said large document back in a reverse direction with said large document feeder without copying, to a position wherein a leading portion of said large document is retained by said document feeder, and then, promptly thereafter, automatically again reversing the direction of feeding said large document with said large document feeder and moving said large document away from the front of said large document copier at a copying speed synchronized with movement of said copy sheet or web for copying said large document onto said copy sheet or web.

Further specific features provided by the system disclosed herein, individually or in combination, include those wherein said large document is retained throughout all said steps in said large document feeder without substantial slippage or skew, with plural rigidly supported roller nips; wherein the response to said copying activation, said large document is fed back to the front of said large document copier at a reverse direction speed which is substantially faster than said copying speed, and then automatically promptly thereafter said large document is again fed from the front of said large document copier towards the rear thereof but at said copying speed; and wherein in said step of automatically initially feeding said large document away from the front of said large document copier with said large document feeder said document is fed at a feeding speed which is substantially faster than said copying speed; and/or wherein said steps are repeated without substantial documents slippage or skew with the document retained in said large document feeder until the selected number of copies is made from a document before releasing that document from said large document feeder.

Further disclosed specific features include, in a large document copier, having a large document sheet feeder for moving a large document at a preset sheet feeding copying velocity past a scanning slit in said copier, for copying the large document onto a large copy sheet or web fed into said copier by a large copy sheet or web feeder feeder, with means for inserting large documents into said large document sheet feeder from a front side of said copier, and means for inserting copy sheets from said front side of said copier, the improvement comprising; bidirectional document drive means for bidirectionally feeding a large document with said large document sheet feeder, and control means for controlling said bidirectional document drive means in response to the input of documents and copying sheets such that a large document is initially fed in a first direction by said large document sheet feeder towards the rear of said copier, paused until a copy sheet is inputted from said front side of said copier, and then, in response to the inputting of a copy sheet, the same large document is next fed in a second, reversed, direction by said large document sheet feeder at a speed substantially higher than said sheet feeding copying velocity, and then, without pausing, the same large document is next again fed in said first direction by said large document sheet feeder, but at said sheet feeding copying velocity; and, wherein said control means controls said document drive means during said initial feeding in said first direction at a speed substantially higher than said sheet feeding copying velocity; and wherein said large document sheet feeder retains a large document inserted therein without substantial document slippage or skew until a selected number of copies is made from a document before releasing that document from said large document feeder.

All references cited in this specification, and their references, are incorporated by reference herein where appropriate for appropriate teachings of additional or alternative details, features, and/or technical background.

Various of the above-mentioned and further features and advantages will be apparent from the specific apparatus and its operation described in the example below, as well as the claims. Thus, the present invention will be better understood from this description of this embodiment thereof, including the drawing figures (approximately to scale) wherein:

Figure 1:
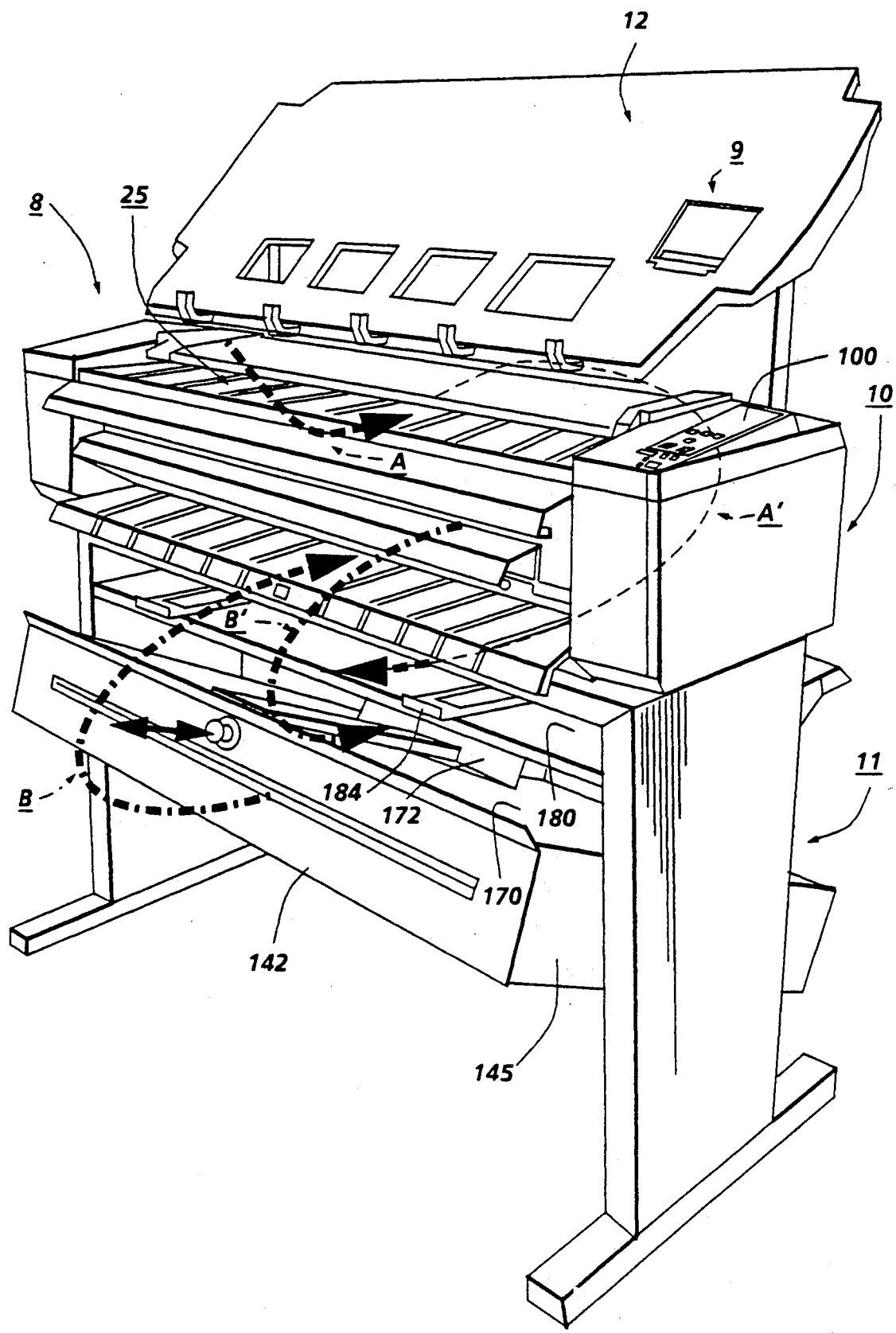
FIG. 1 is a frontal perspective view of one embodiment of a copying machine incorporating the features of the present invention; with simplified exemplary dashed line document feeding paths, and dot-dashed line copy sheet feeding paths, all with movement arrows.
Figure 2:
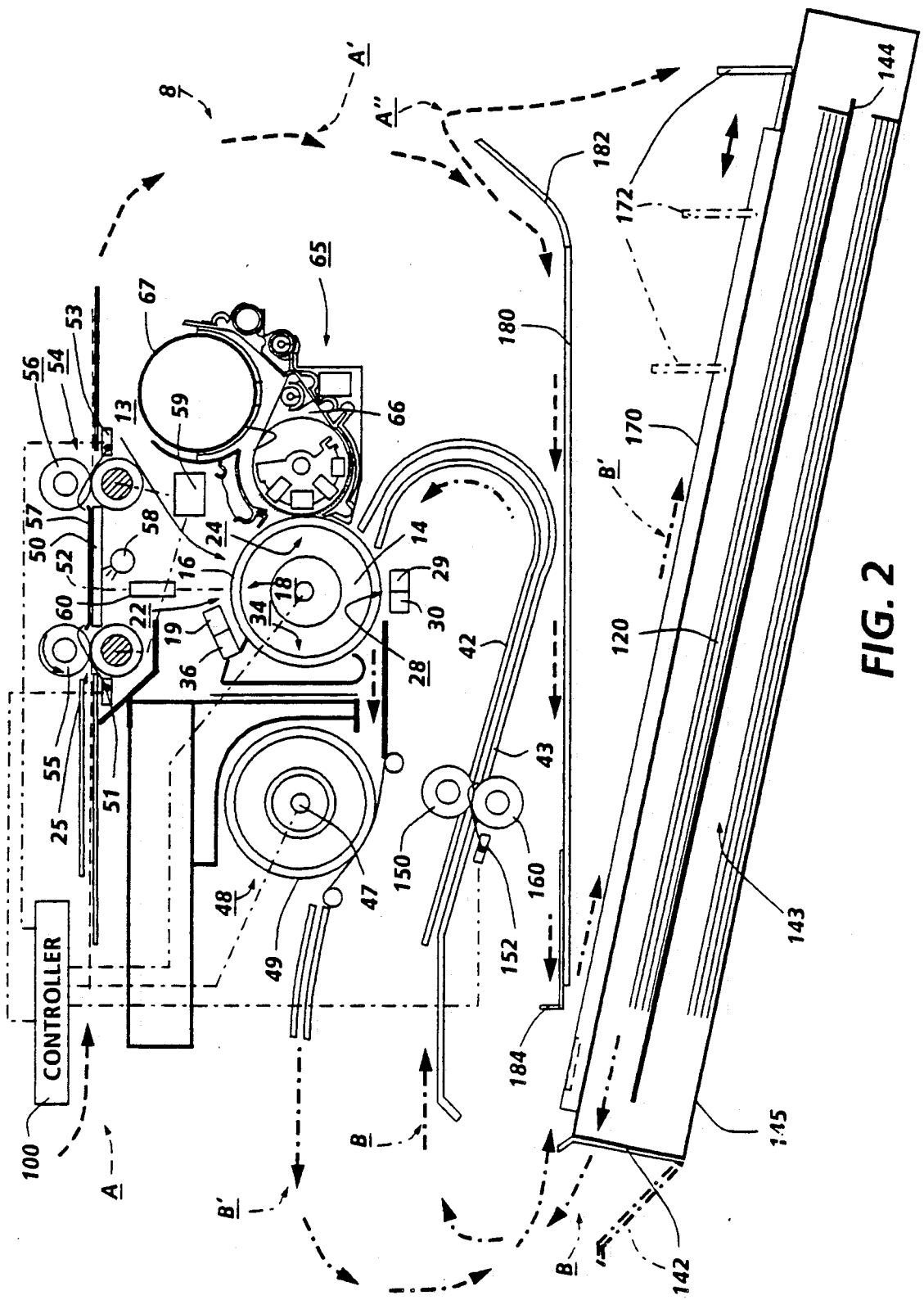
FIG. 2 is a schematic cross-sectional side view of the exemplary machine of FIG. 1.

Describing now in further detail the exemplary embodiment with reference to the Figures, there is shown an automatic xerographic reproduction or printing machine 8 for copying large documents, fed by constant velocity type document transport or feeder (CVT) 54. Machine 8 has a suitable frame or housing 10 within which its machine xerographic section 13 is operatively supported. The exemplary copier 8 may be, for example, a well known Xerox Corporation large document copier, or any other xerographic or other copier, as illustrated and described in various patents cited above, and other wise. As shown in FIG. 1, the processor or xerographic section 13 thereof is supported by a stand 11 here. A document organizer 12 is attached to the frame 11, providing a document tray above the document sheet input 25 (see path A), and sloping down towards the front of the machine 8. The document organizer 12 may include a flip-card type of operator instruction manual 9. Also it is apertured as shown to provide a view therethrough of documents being fed rearwardly by the CVT 54. It also has front stop or catch fingers as illustrated.

The control of all copier and document handler and finisher operations is by a machine controller 100. The controller 100 preferably and conventionally comprises a known type of programmable microprocessor system, as exemplified by extensive prior art, e.g., U.S. Pat. No. 4,475,156 and its references. The particular desired functions and timings thereof are provided by conventional software programming of the controller 100 in non-volatile memory. The controller 100 controls all of the machine steps and functions described herein, including all sheet feeding. This includes the operations of the document feeder and its drives, document and copy sheet gates, copy sheet feeder drives, any finishes, etc. As further taught in those references, the controller 100 also conventionally provides for storage and comparison of the counts of the copy and document sheets, the number of documents fed and recirculated, the desired number of copy sets, and other selections by the operator through a connecting panel of control switches. Controller information is utilized to control and keep track of the position of the document, the copy sheets, and the operative components of the apparatus by their electronic connections to the controller. For example, the controller may be conventionally connected to receive and act upon jam, timing, positional, and other control signals conventionally received from various document sheet sensors in the document path. The controller automatically actuates and regulates the positions of sheet path drives and gates depending upon which mode of operation is selected, and the status of copying in that mode. The controller 100 also conventionally operates and changes displays on a connecting instructional display panel, which preferably includes said operator function selection buttons or switches.

Briefly, and as will already be familiar to those skilled in the art, the machine xerographic section 13 includes an image recording member, here a rotatable photoreceptor 14 comprising a drum having a photoconductive imaging surface 16. Operatively disposed about the path of imaging surface 16 is a charge station 18 with charge corotron 19 for placing a uniform charge on the photoconductive surface 16, and exposure station 22 where the previously charged photoconductive surface 16 is exposed to light image rays from the document 9 being copied or reproduced, a development station 24 where the latent electrostatic image created on photoconductive surface 16 is developed by toner, a transfer station 28 with transfer and detack corotrons 29, 30 for transferring the developed image to a suitable copy substrate media or material such as a copy sheet 120 fed forward thereto in timed relation with the developed image on photoconductive surface 16, and a cleaning station 34 that may include a cleaning blade and a discharge corotron 36 for neutralizing residual charges and removing leftover developer from surface 16.

Copy sheets 120 are brought forward to transfer station 28 by mating idler roll 160 and registration and drive roll 150, with sheet guides 42, 43 serving to guide the sheet through an approximately 180° turn prior to transfer station 28. Following transfer, the sheet 28 is carried forward to a fusing section 48 where the toner image is fixed by fusing roll 49. Fusing roller 49 is heated by a suitable heater such as lamp 47 disposed within the interior of roll 49. In this exemplary fuser 48, the copy sheet is held by an opposing belt against the controlled temperature heated surface of roll 49. After fixing, the copy sheet is discharged.

The illustrated CVT document handling system 54 provides for automatically transporting individual document sheets onto and over the conventional platen imaging station 50 of the copier 8 at an accurately predetermined steady velocity. Documents are inputted to the front or upstream end thereof via an input path 25. A narrow but full width transparent glass platen 50 preferably supports or confines the lower surface of the document as the document is moved past a scanning line 52 by the CVT 54, under a closely spaced white backing plate or foot 57 which confines the upper surface of the document there. As will be understood, scanning line 52 extends across the width of platen 50 at a desired position where the document is to be optically scanned line by line as the document is uniformly moved at a constant copying speed over platen 50 by document transport 54. CVT transport 54 has input and output document feed roll pairs 55, 56, respectively, on each side of scanning line 52 for moving document 9 across platen 50 at the predetermined copying velocity or speed. An exposure lamp 58 is provided to illuminate a striplike area of platen 50 at scanning line 52. The image rays from the document line being scanned are transmitted by a gradient index fiber lens array 60 to exposure station 22 to expose the photoconductive surface 16 of the moving photoreceptor 14. For 1 to 1 copying (that is, equal size or 100% reduction/magnification copying), the velocity of the document at scanning line 52 is set equal to the velocity of surface 16 of the photoreceptor 14. The photoreceptor 14 is conventionally driven at a constant speed by a conventional synchronous motor drive.

These document feed roll pairs 55, 56 here are non-conventional, and are non-conventionally driven. Here, the CVT 54 drive is by a controller programmed controlled stepper motor drive 59 of the driving rollers, which are the lower rollers of the illustrated roller pair 55, 56 nips. These lower driving rollers are preferably a spaced plurality of accurately OD ground rubber rollers integrally mounted along a very rigid large diameter steel center shaft which is accurately rotatably mounted to the machine frame by ball bearings and rotatably driven by the stepper motor drive 59. This provides accurately planar, non-skewing, and non-wrinkling feeding nips for the document. The opposing, mating, idler rollers thereabove are resiliently deformably spring mounted to be deflectable upwardly by document passage through the nips, and preferably have some freedom of axial tilt as well, so as not to induce any skew on the document. As will be described further herein, here this stepper motor drive 59 of the CVT 54 is reversible, with a higher reverse direction document driving speed. Conventional static eliminator brushes may be provided at the CVT 54 output, which is towards the rear of the machine.

Developing station 24 conventionally includes a developer housing 65, the lower part of which forms a sump 66, fed from a dispenser 67 of developer comprising a mixture of larger carrier particles and smaller toner or ink particles. A rotatable magnetic brush developer roll 68 is disposed in developer housing 65 in operative relation to the photoconductive surface 16. Developer roll 68 brings toner from sump 66 into developing relationship with photoreceptor 14 to conventionally develop the latent electrostatic images formed on the photoconductive surface 16 from the document image exposure.

The copy sheet handling system 100 here includes a humidity control storage chamber with an internal electrical heater for the large copy sheets 120. This comprises a copy sheet chamber 145, in which the copy sheets 120 to be fed are supported in stack-like fashion on a tray base 144. Extra sheets may be stored thereunder in tray base 143 for later use by placement onto base 144 for feeding. Heating of the chamber maintains dryness of the sheets as well as preventing curl from setting up in the sheets.

Replenishment of copy sheets into copy sheet tray 145 is quick and easy for a number of reasons. First, the trays are tilted about 20 degrees with respect to a horizontal plane. This allows copy sheets to settle against the back of the copy sheet trays due to gravity while simultaneously inhibiting multifeeding. In loading a fresh supply of copy sheets into the chamber, cover 142 is opened and a stack of copy sheets are placed onto base 144 and cover 142 is closed. The positioning angle of the tray 144 enhances the feeding of single copy sheets therefrom since gravity is being used to inhibit multifeeding.

It will be appreciated that alternatively or optionally the copy sheet supply may be from a web roll. This may include a chopper cutter automatically cutting off a desired fed length of copy sheet to match the document sheet length, which can be measured automatically from the input feeding time of the document by the CVT 54 between actuation and deactuation of switch 51, for example. That is, the transit time from the initial document trail edge actuation of switch 51 and the start of feeding (or the lead edge actuation of switch 53 as feeding starts) until the release of switch 51 as the trail edge of the document passes it. See U.S. Pat. No. 4,823,663 for an example of a web roll feeder.

For feeding a copy sheet 120 into the copy processor for copying, as described in the above-referenced copending applications, a simple feeding assist device may be provided to help the operator hand manipulate the topmost copy sheet on tray 144 out the front door 142 of chamber 145. The removed copy sheet is then hand manipulated via copy input path B into the nip of the stalled copy sheet input and registration roll pairs 150, 160, tripping switch 152 there. Registration roll pair 150, 160 then are driven to advance the copy sheet along a paper guide path to transfer station 28, registering the copy sheet with the image on the photoconductive surface 16 of photoreceptor 15, by bringing the copy sheet into transfer relation with the developed image on photoconductive surface 16 at transfer station 28. There, suitable transfer and detack means, such as transfer and detack corotrons 29, 30, transfer the toner image to the copy sheet and then separate the sheet for fixing the image in downstream fuser 48 and discharge as a finished copy sheet along copy output path B'. Copy output path B' here preferably includes a copy output stacking tray 170 (with an slide adjustable backstop 172 adjustable to the size of the copy media), into which the copy sheet may be directed as it is outputted.

In operation, a document to be copied is first inserted by the operator into the front of the machine 8, via document input 25 in the path direction of arrow A. The document may be fed from a face-up stack of documents in the document organizer 12, if desired. The inserted document lead edge trips a switch 51 at the nip of the input or upstream rollers 55. The document is then automatically fed in by the CVT 54, and it next actuates a second switch 53 in the downstream rollers 56 nip. The CVT 54 advances the document downstream until it reaches a pause position, in which only the trailing edge of the document is in the CVT 54, held in the downstream rollers 56 nip. This is signaled and calculated from the release of switch 51 as the trail edge of the document passes that switch. At that document pause position the machine then stops, and waits for the insertion of a copy sheet. Note that the document was not copied in this step, unlike a normal large document copier. Thus, this initial step may be done with a much higher document feeding speed than is used for copying. Also note that in this position that the rest of the document is now in path A', at the rear of the machine 8, and none of it is obstructing the front of the machine.

Due to gravity, the document will hang downwardly in path A'. A document catch tray 180 has a guide baffle extension portion 182 positioned to engage and guide a large document fed downstream by CVT 54 into this tray 180.

The copy sheet is then unobstructedly inserted into the nip of the registration roll 150, 160 as shown by arrow B, and released by the operator. This also actuates associated switch 152. In response to this and the operator actuation of the controller display "start print" or "copy" button, the microprocessor controller 100 then restarts the document sheet CVT drive 54 in the reverse direction, again without copying, and at a much higher speed than the document copying speed. This briefly feeds the entire document out to the front of the machine again (reversing path A), but only temporarily, and only until the document lead edge is back in the upstream or input nip of rollers 55, in a position for start of scan. Then the document and copy sheet are both automatically driven in synchronism with one another, at the copying speed, with the document traveling into the machine in the direction of arrow A and the copy sheet traveling into the machine in the direction of arrow B.

This process may then be repeated for the number of copies required and/or set into the control 100 by conventional operator display buttons. However, with this system, the document does not need to be initially reloaded for subsequent copies. The document remains held in at least one nip of the CVT 54 at all time until all the selected number of copies thereof are made.

After the selected number of copies are made of the document, the document is automatically ejected via path A' into tray 180, up to front stop fingers 184. This tray 180 need not be as long as the document. After the trail edge of the document is released by the rollers 56 nips, a trail end portion of the document may be allowed to fall and overhang the rear end of the tray 180 as shown by document path A".

Note that this document tray 180 is front accessible for operator front unloading. So are all the other trays of this copying machine. Also, all of the disclosed document and copy trays 12, 180, 170, 144 and 143 here are respectively superposed, overlying one another, and the copier processor 10, to provide a compact machine.

While the embodiment disclosed herein is preferred, it will be appreciated from this teaching that various alternatives, modifications, variations or improvements therein may be made by those skilled in the art, which are intended to be encompassed by the following claims.

I claim:

1. A system for copying large documents on a large document copier having a large document sheet feeder and a large copy sheet or web feeder with improved convenience and efficiency comprising the steps of:
    inserting the leading edge of said large document into said document feeder from the front of said large document copier,
    automatically initially feeding said large document away from the front of said large document copier with said large document feeder,
    pausing said feeding of said large document by said large document feeder in a position wherein a trailing portion of said large document is retained by said document feeder and a substantial portion of said large document is removed from the front of said large document copier so that the front of said large document copier is unobstructed by said large document,
    inserting a copy sheet or web into said large document copier from the front thereof for copying.
    activating said large document copier to copy said large document onto said copy sheet or web after said copy sheet or web has been inserted,
    and, in response to said copying activation, first automatically rapidly feeding said large document back in a reverse direction with said large document feeder with out copying, to a position wherein a leading portion of said large document is retained by said document feeder, and then, promptly thereafter, automatically again reversing the direction of feeding said large document with said large document feeder and moving said large document away from the front of said large document copier at a copying speed synchronized with movement of said copy sheet or web for copying said large document onto said copy sheet or web.

2. The copying system of claim 1, wherein said large document is retained throughout all said steps in said large document feeder without substantial slippage or skew with plural rigidly supported roller nips.

3. The copying system of claim 1, wherein in response to said copying activation, said large document is fed back to the front of said large document copier at a reverse direction speed which is substantially faster than said copying speed, and then automatically promptly thereafter said large document is again fed from the front of said large document copier towards the rear thereof but at said copying speed, and wherein a portion of said large document is retained throughout these steps in said large document feeder and fed without substantial slippage or skew.

4. The copying system of claim 1, wherein in said step of automatically initially feeding said large document away from the front of said large document copier with said large document feeder said document is fed at a feeding speed which is substantially faster than said copying speed.

5. The copying system of claim 1, wherein said steps are repeated without substantial document slippage or skew with the document retained in said large document feeder until the selected number of copies is made from a document before releasing that document from said large document feeder.

6. In a large document copier, having a large document sheet feeder for moving a large document at a preset sheet feeding copying velocity past a scanning slit in said copier, for copying the large document onto a large copy sheet or web fed into said copier by a large copy sheet or web feeder, with means for inserting large documents into said large document sheet feeder from a front side of said copier, and means for inserting copy sheets from said front side of said copier, the improvement comprising:

bidirectional document drive means for bidirectionally feeding a large document with said large document sheet feeder, and control means for controlling said bidirectional document drive means in response to the input of documents and copy sheets such that a large document is initially fed in a first direction by said large document sheet feeder towards the rear of said copier, paused until a copy sheet is inputted from said front side of said copier, and then, in response to the inputting of a copy sheet, the same large document is next fed in a second, reversed, direction by said large document sheet feeder at a speed substantially higher than said sheet feeding copying velocity, and then, without pausing, the same large document is next again fed in said first direction by said large document sheet feeder but at said sheet feeding copying velocity.

7. The large document copier of claim 6, wherein said control means controls said document drive means during said initial feeding in said first direction at a speed substantially higher than said sheet feeding copying velocity.

8. The large document copier of claim 6, wherein said large document sheet feeder retains a large document inserted therein without substantial document slippage or skew until a selected number of copies is made from a document before releasing that document from said large document feeder.

* * * * *